Feb. 4, 1969 E. O. UHRIG 3,426,285
AMPLIFIER TESTING APPARATUS
Filed Sept. 7, 1965
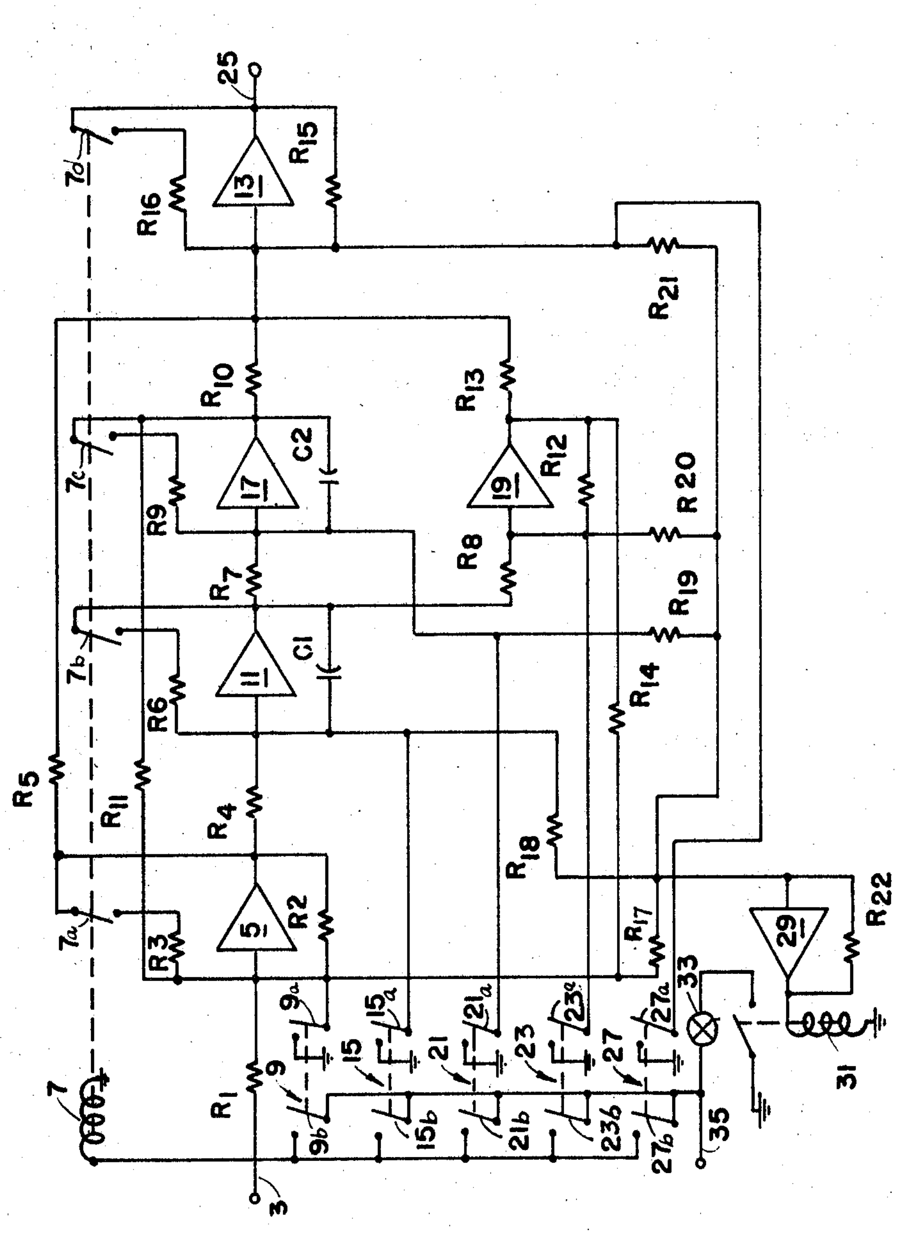
INVENTOR.
EDWARD O. UHRIG
BY
Arthur L. Collins
ATTORNEY United States Patent Office 3,426,285
Patented Feb. 4, 1969

3,426,285
AMPLIFIER TESTING APPARATUS

Edward O. Uhrig, Catonsville, Md., assignor, by mesne assignments, to the United States of America as represented by the Secretary of the Navy Continuation-in-part of application Ser. No. 189,938, Apr. 24, 1962. This application Sept. 7, 1965, Ser. No. 485,648
U.S. Cl. 330—2 4 Claims
Int. Cl. G01r *35/00*

ABSTRACT OF THE DISCLOSURE

The present invention relates to novel and improved apparatus for detecting improper operation of any of a plurality of high gain amplifier circuits which are commonly used in complex electronic circuitry and which feed energy back to their input circuits to mill the input signal. The improved apparatus includes a fault detector circuit that is energized when a potential is developed on the input circuit of any of the amplifiers and a manually operable switch for each amplifier that selectively grounds the input circuit of its respective amplifier and stabilizes the feedback circuits of each of the amplifiers.

This is a continuation-in-part of copending application Ser. No. 189,938 filed Apr. 24, 1962 now abandoned.

So called "downtime" often presents a serious problem in the operation and use of the modern electronic computer. Use of the plug-in unit design, where complete computer amplifier sections or the like are replaced as a unit, often minimize "down time" once the faulty plug-in unit has been localized and identified. In the complex computer system, however, prolonged "down time" often results in locating or isolating the defective unit itself.

It is therefore a principal object of the present invention to provide novel and improved circuitry which can be used to localize and identify the defective amplifier section of a computer network or the like that includes a plurality of such sections.

It is a further object of the present invention to provide a novel and improved computer fault isolation circuit which monitors the normal null potential condition at the input of each amplifier section normally used in such computer apparatus.

Other objects and many of the attendant advantages of this invention will be readily appreciated as the same becomes better understood by reference to the following detailed description when considered in connection with the accompanying drawing wherein the single figure of the drawing is a diagrammatic view of a preferred embodiment of the present invention as it might be empolyed in typical though simplified computer network.

Referring now in detail to the drawing, it will be seen that the circuit input signal is fed through conductor 3 and through resistor R–1 to the high gain summing amplifier 5. Resistor R–2 is connected in parallel with amplifier 5 and normally provides the required amount of feedback for the required summing operation. An additional feedback circuit for amplifier 5 extends from its output circuit through the armature 7*a* of relay 7 and through resistor R–3 to the junction of resistor R–1 and the amplifier. The junction of resistor R–1 and amplifier 5 is also selectively coupled to ground through contact 9*a* of manual switch 9. The output circuit of summing amplifier 5 is coupled to the first integrating amplifier 11 through resistor R–4 and to the input circuit of the final summation amplifier 13 through resistor R–5. Condenser C–1 is coupled across amplifier 11 as shown and normally provides the required amount of feedback for the integrating operation. An additional feedback circuit for amplifier 11 extends from the output circuit of amplifier 11 through armature 7*b* of relay 7 and through resistor R–6 to the junction of resistor R–4 and the amplifier. The junction of resistor R–4 and the amplifier 11 is also selectively coupled to ground through contact 15*a* of manual switch 15. The output circuit of the first integrating amplifier 11 is coupled to the second integrating amplifier 17 through resistor R–7 and to the inverter amplifier 19 through resistor R–8. Condenser C–2 is connected in parallel with amplifier 17 as shown and normally provides the required amount of amplifier 17 as shown and normally provides the required amount of feedback for a second intgerating operation. An additional feedback circuit for amplifier 17 extends from the output circuit of amplifier 17 through armature 7*c* of relay 7 and through resistor R–9 to the junction of resistor R–7 and the amplifier. The junction of resistor R–7 and the amplifier 17 is also selectively coupled to ground through contact 21*a* of manual switch 21. The output circuit of amplifier 17 is coupled to the final summation amplifier 13 through resistor R–10 and to the input circuit of amplifier 5 through resistor R–11. Resistor R–12 is connected in parallel with amplifier 19 as shown and provides the required amount of feedback energy for proper operation of inverter 19. The junction of resistor R–8 and inverter 19 is coupled to ground through contact 23*a* of manual switch 23. The output circuit of inverter 19 is coupled to the final summation amplifier 13 through resistor R–13 and to the input circuit of amplifier 5 through resistor R–14. Resistor R–15 is connected in parallel with amplifier 13 as shown and normally provides the required amount of feedback energy for the summing operation. An additional feedback circuit for amplifier 13 extends from its output circuit 25 through armature 7*d* of relay 7 and through resistor R–16 to the junction of resistor R–10 with amplifier 13. The junction of resistor R–10 with amplifier 13 is also selectively coupled to ground through contact 27*a* of manual switch 27. Resistors R–17, R–18, R–19, R–20 and R–21 respectively couple the input circuits of amplifiers 5, 11, 17, 19 and 13 to the input circuits of the fault detector amplifier 29. Resistor R–22 is connected in parallel with amplifier 29 as shown and provides the required amount of feedback energy for proper operation. The output circuit of amplifier 29 drives the energizing coil of relay 31 which controls energization of the fault light 33 from the positive 28 volt supply line or the like 35. The energizing coil or relay 7 is also coupled to the positive 28 volt supply line 35 through the parallel connected manually controlled contacts 9*b*, 15*b*, 21*b*, 23*b* and 27*b* of switches 9, 15, 21, 23 and 27.

It is to be understood that the circuitry thus far described which includes the summation amplifiers 5 and 13, the integrating amplifiers 11 and 17 and the inverter amplifier 19 with their conventional resistive capacitive feedback circuit are illustrative only of the type of computer circuit with which the improved fault isolation circuit of the present invention may be used. Any other suitable circuit including those that are much more complex which perform various arithemetic and mathematical operations could be fault tested and isolated in the following described manner without departing from the spirit or scope of the present invention.

In operation, the summation and integration computer operations which are successively applied as herein described to the incoming signal on input line 3 each employ the use of high gain amplifiers in which a predetermined amount of feedback energy normally nulls the input signal. When one or more components in any given amplifier unit fails to function properly, the null condition at the input of the malfunctioning amplifier no longer prevails and a potential is fed through its associated resistor to the fault detection amplifier 29. This causes energization of relay 31 and fault light 33 signals the malfunction. When one amplifier fails, each of the other amplifiers in the computer also become unbalanced due to upset in their interconnected feedback circuits.

In order to isolate the defective amplifier unit in the computer so that it can be quickly replaced, switches 9, 15, 21, 23 and 27 are successively operated. As each switch is operated, the input circuit of its associated amplifier is grounded and an additional feedback circuit is completed to stabilize each of the other amplifiers. Thus, for example, if amplifier 11 were defective, the potential at the junction of resistor R–4 and amplifier 11 would not be nulled. Inasmuch as the output of amplifier 11 no longer drives amplifiers 17, 19 and 13 as it did under normal operating conditions and inasmuch as the feedback circuits for amplifier 5 are now differently energized through resistors R–11 and R–14, amplifiers 17, 19, 13 and 5 saturate or function so as to also provide a potential other than null at their inputs thereby energizing amplifier 29, relay 31 and fault light 33. When switch 9 is operated, amplifier 29, relay 31 and fault light 33 remain energized due to the continued existence of the potential at the input of amplifier 11 as well as at the inputs of amplifiers 17 and 13. Similarly, fault light 33 remains energized when switches 21, 23 and 27 are operated. When, however, switch 15 is operated, the input circuit to defective amplifier 11 is grounded through contact 15*a* and the error signal fed through resistor R–18 to the fault detection circuit is removed. When switch 15 is operated, relay 7 is simultaneously energized through contact 15*b*. Armatures 7*a*, 7*c*, and 7*d* then respectively provide additional feedback circuits for amplifiers 5, 17 and 13 so as to stabilize and remove all error signals feeding the fault detection amplifier 29. Thus, it is seen that in order to isolate the malfunctioning amplifier unit switches 9, 15, 21, 23 and 27 are successively operated until fault light 33 is deenergized. When this occurs, the defective amplifier unit is quickly replaced and prolonged "down time" is avoided.

Obviously, many modifications and variations of the present invention are possible in the light of the above teachings. It is therefore to be understood that within the scope of the appended claims, the invention may be practiced otherwise than as specifically described.

What is claimed is:

1. In circuitry including a plurality of high gain amplifier circuits in which feedback energy normally substantially neutralizes an input signal to each said circuit, the improvement comprising:

(a) means for individually and successively grounding the input signal of each said circuit;

(b) means for modifying the feedback energy to all said circuits when the input signal of any said circuit is grounded;

(c) and means for detecting a potential at the input of any of the said circuits.

2. The improvement substantially as described in claim 1 wherein the means for grounding the input signal of each amplifier circuit includes a manually controlled switch for each said circuit series connected between its associated amplifier input circuit and ground.

3. The improvement substantially as described in claim 2 wherein the means for modifying the feedback energy to the amplifier circuits includes a relay which is energized when any of the manually controlled switches is operated to couple its respective amplifier input circuit to ground and a relay controlled contact connected in series with each amplifier feedback circuit.

4. The improvement substantially as described in claim 1 wherein the means for detecting a potential at the input of any of the amplifier circuits includes a fault light controlled by a relay that is energized when a potential is developed on any of the input circuits of the amplifier circuits.

References Cited

UNITED STATES PATENTS

| | | | |
|---|---|---|---|
| 3,129,326 | 4/1964 | Balaban | 235—183 |
| 3,139,590 | 6/1964 | Brown | 330—51 X |
| 3,237,116 | 2/1966 | Skinner et al. | 330—51 X |

NATHAN KAUFMAN, *Primary Examiner.*

U.S. Cl. X.R.

330—51